Figure 1:
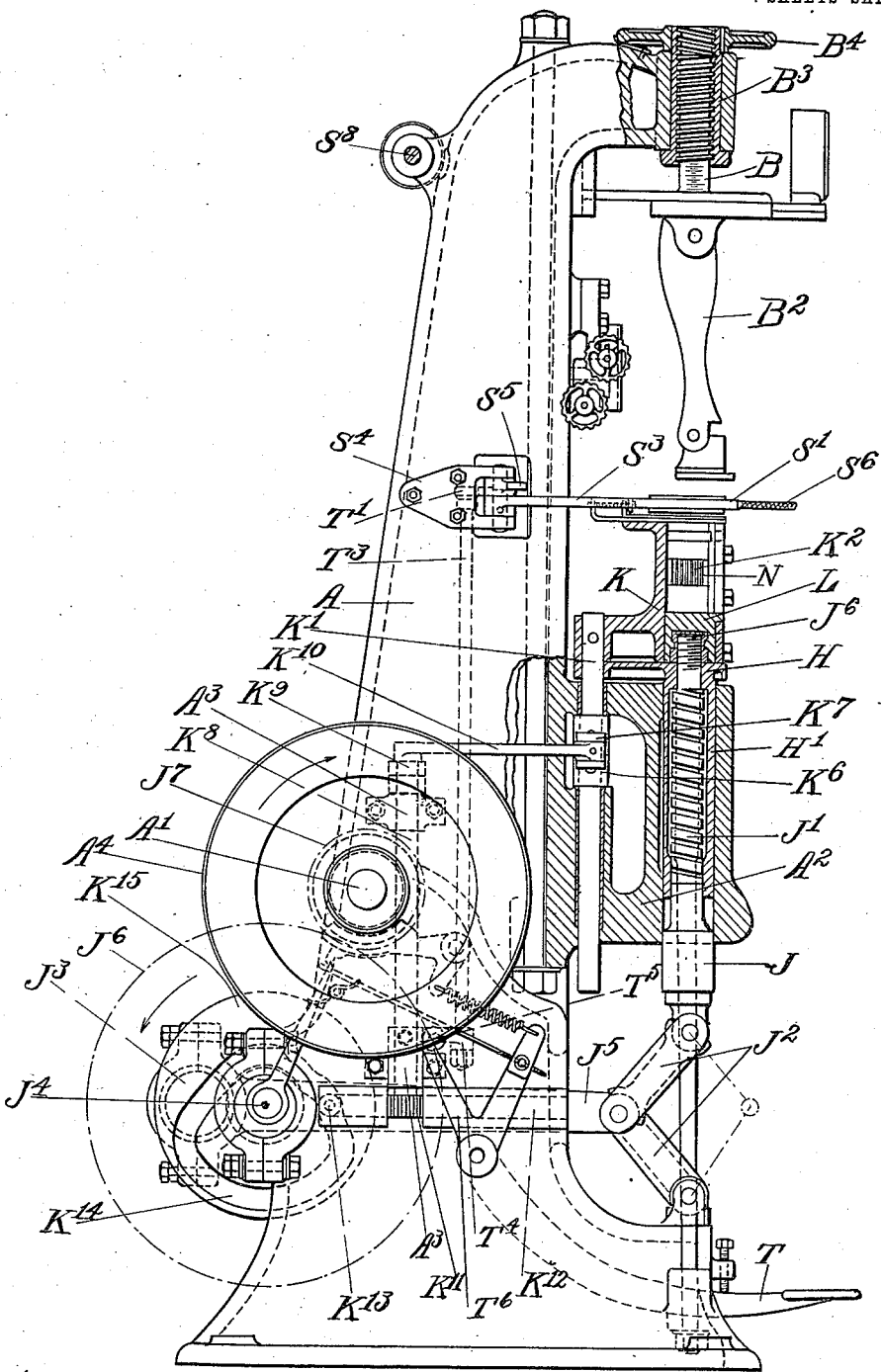

W. R. BARCLAY & J. GOULDBOURN.
MACHINE FOR ATTACHING HEELS.
APPLICATION FILED SEPT. 8, 1904.

1,011,308.

Patented Dec. 12, 1911.
7 SHEETS—SHEET 2.

W. R. BARCLAY & J. GOULDBOURN.
MACHINE FOR ATTACHING HEELS.
APPLICATION FILED SEPT. 8, 1904.

1,011,308.

Patented Dec. 12, 1911.

7 SHEETS—SHEET 3.

WITNESSES.
Bernard Barrows.
Bertha L. Hannah.

INVENTORS.
William Roderick Barclay
Joseph Gouldbourn
By their Attorney
Nelson W. Howard W. R. BARCLAY & J. GOULDBOURN.
MACHINE FOR ATTACHING HEELS.
APPLICATION FILED SEPT. 8, 1904.

1,011,308.

Patented Dec. 12, 1911.

7 SHEETS—SHEET 4.

W. R. BARCLAY & J. GOULDBOURN.
MACHINE FOR ATTACHING HEELS.
APPLICATION FILED SEPT. 8, 1904.

1,011,308.

Patented Dec. 12, 1911.

7 SHEETS—SHEET 5.

W. R. BARCLAY & J. GOULDBOURN.
MACHINE FOR ATTACHING HEELS.
APPLICATION FILED SEPT. 8, 1904.

1,011,308.

Patented Dec. 12, 1911.

7 SHEETS—SHEET 6.

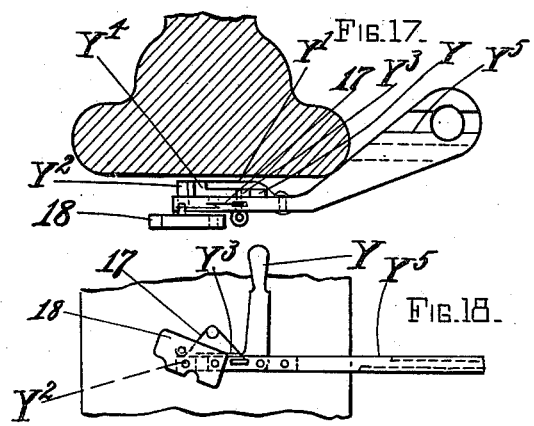
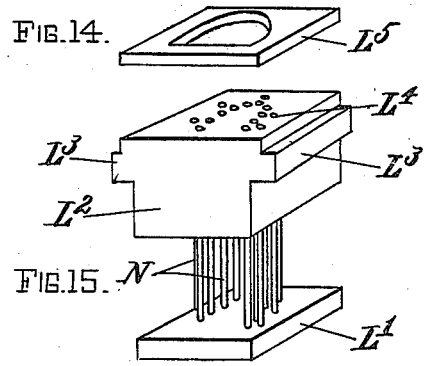
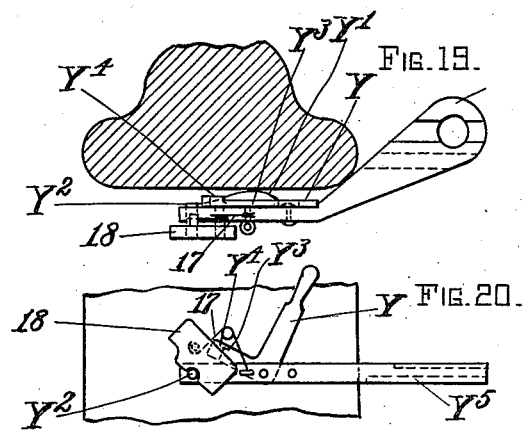
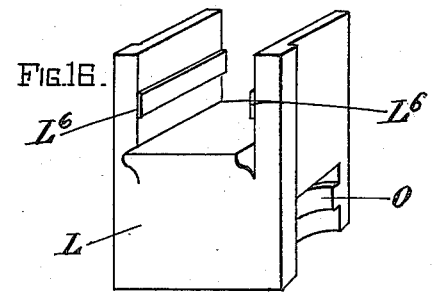
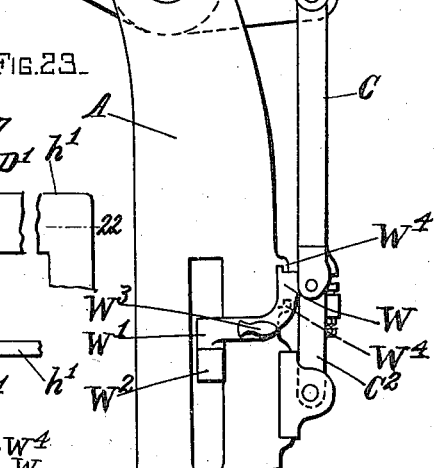
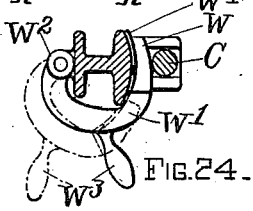

UNITED STATES PATENT OFFICE.

WILLIAM RODERICK BARCLAY AND JOSEPH GOULDBOURN, OF LEICESTER, ENGLAND, ASSIGNORS TO UNITED SHOE MACHINERY COMPANY, OF PATERSON, NEW JERSEY, A CORPORATION OF NEW JERSEY.

MACHINE FOR ATTACHING HEELS.

1,011,308.      Specification of Letters Patent.      Patented Dec. 12, 1911.

Application filed September 8, 1904. Serial No. 223,795.

*To all whom it may concern:*

Be it known that I, WILLIAM R. BARCLAY, a citizen of the United States of America, and JOSEPH GOULDBOURN, a subject of the King of England, residing at Leicester, in the county of Leicester, England, have invented certain Improvements in Machines for Attaching Heels, of which the following description, in connection with the accompanying drawings, is a specification, like reference characters on the drawings indicating like parts in the several figures.

This invention relates to improvements in machines for attaching heels, heel-lifts, or heel-tips with fillers to the heels of boots and shoes and if desired inserting slugs therein, its main object being to enable top-lifts or metal heel-tips with fillers to be attached to the heel by a secondary set of nails after the heel has been attached to the boot or shoe by a primary set of nails which may have been driven from the exterior of the boot. Further a machine according to this invention may be used to attach Louis or like heels having a minimum cross-section of considerable less area than the lifts adjacent to the heel-seat. In such cases the heels may be separated into two layers or sections, and the larger heel-seat layer be first attached by a set of nails extending over an area greater than the minimum cross-sectional area of the second layer, which is attached in its turn by a second set of nails driven within the space occupied by the nails used to attach the first or larger heel-layer. Also a machine according to this invention may be used to drive slugs while stamping or blind-nailing a top-lift on to the projecting heads of the primary attaching nails previously inserted.

Certain features of this invention may be combined with and used as an attachment to heeling machines of the class described in Letters Patent of the United States No. 694,656, granted March 4, 1902, to B. F. Mayo.

According to this invention a movable frame is provided carrying two complete sets of vertically-sliding nail drivers below corresponding nail-holding blocks, one set to be used for the heel-attaching nails, and the other for the tip and filler nails or top-lift slugs, the drivers of both sets being parallel to each other. This frame is arranged to move in a horizontal plane so as to bring each set of drivers alternately over a vertically-reciprocating nail-driver plunger adapted to engage with and operate one set of the nail drivers when so positioned, and the frame is preferably so arranged that the said movements take place crosswise of the operative position of a shoe in the machine. This frame is preferably power-actuated by mechanism which correlates the movement of the frame with that of the plunger, to superimpose the sets of drivers alternately over the reciprocating nail-driving plunger; or it may be manually-operated for this purpose. Means may be arranged on or in connection with the frame to hold the heel and the tip and filler, or top-lift in position over their respective nail-holding blocks and drivers. Two sets of nail-assorting mechanisms may be provided, one on each side of the machine, one to load the heel-attaching nails, and the other the heel-tip and filler-attaching nails, or slugs, if it be desired to spank on and slug a top-lift in place of the tip and filler. These mechanisms may be of known construction and operated in a known manner. A pivoted cover-plate may be provided which can be swung over the heel-tip and filler, after the same is in position over its nail-holder, to prevent the vibration engendered by the movement of the movable frame jerking the nails up out of the nail-holder through the holes in the heel-tip, and the nails being trapped against the edge of the heel as the frame is swung over. A fixed stop on the machine engages the said cover-plate so that the same does not move under the heel, but is kept back swinging on its pivot as the tip moves under the heel. Where a top-lift is to be spanked on to the protruding heads of heel-attaching nails the pressure necessary to force the top-lift on to them is applied to the lift by the movable frame in the final portion of its rise with the plunger. If desired, slugs may be driven into such a spanked-on lift by the drivers previously referred to as allotted to the nails for nailing on tips and fillers or top-lifts.

When this invention is used in the old machines of said Letters Patent No. 694,656 the heel and top-lift carrying swing frame or plate thereof is retained and used to hold the heel, but is prevented from swinging, the top-lift carrier of the said plate not being employed when it is desired to attach to the heel a tip and filler or a top-lift with slugs.

Figure 2:
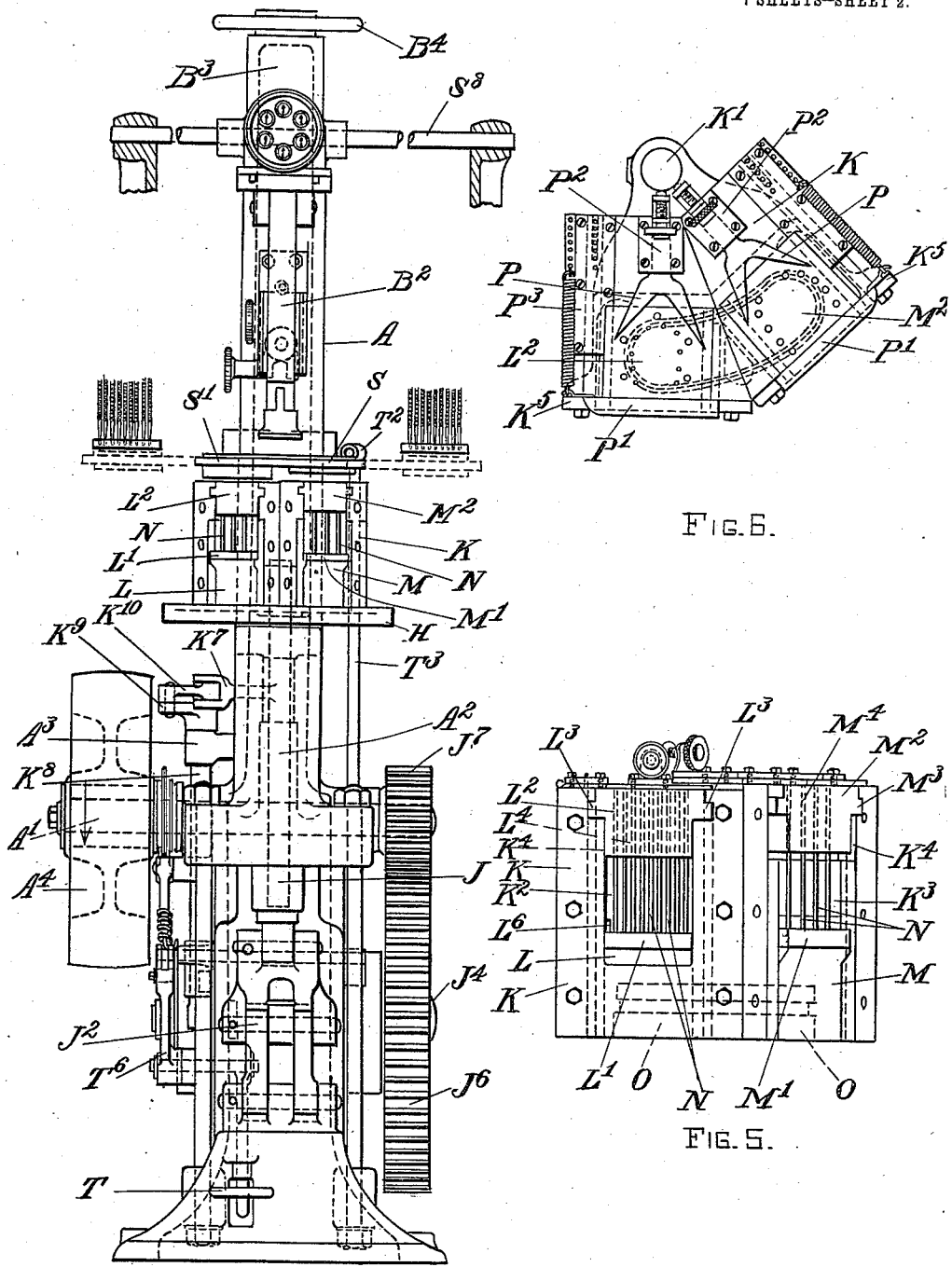
Figure 3:
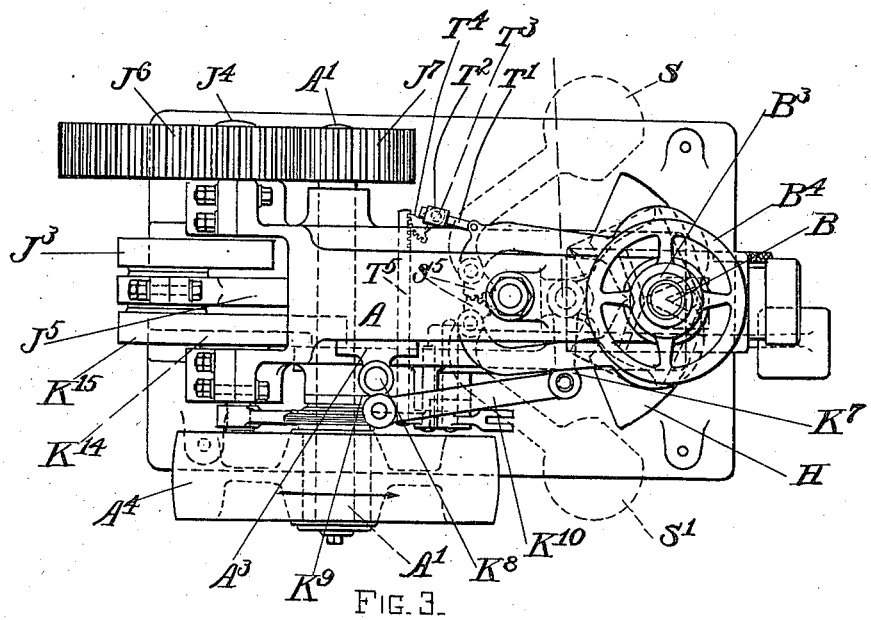
Figure 4:
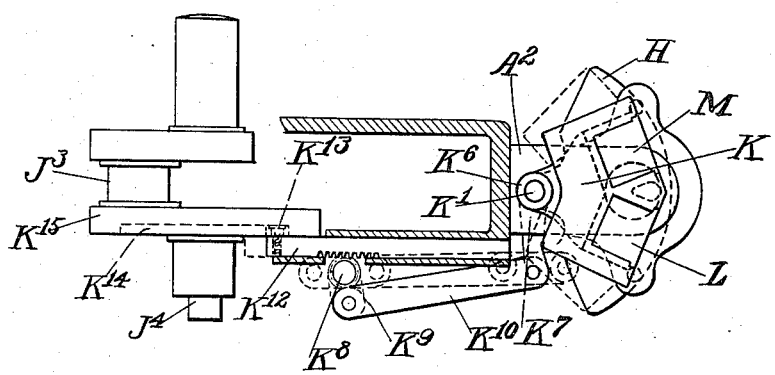
Figure 7:
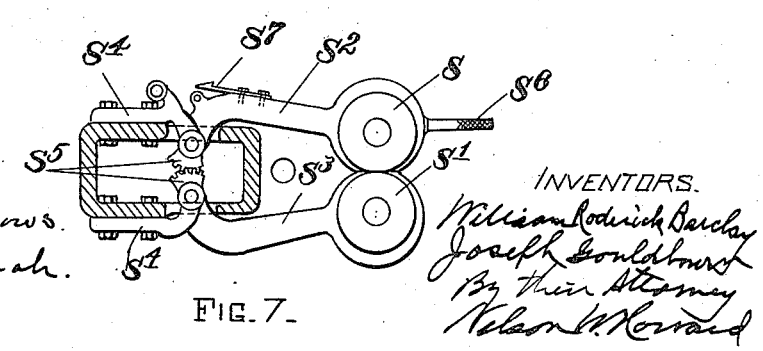
Figure 8:
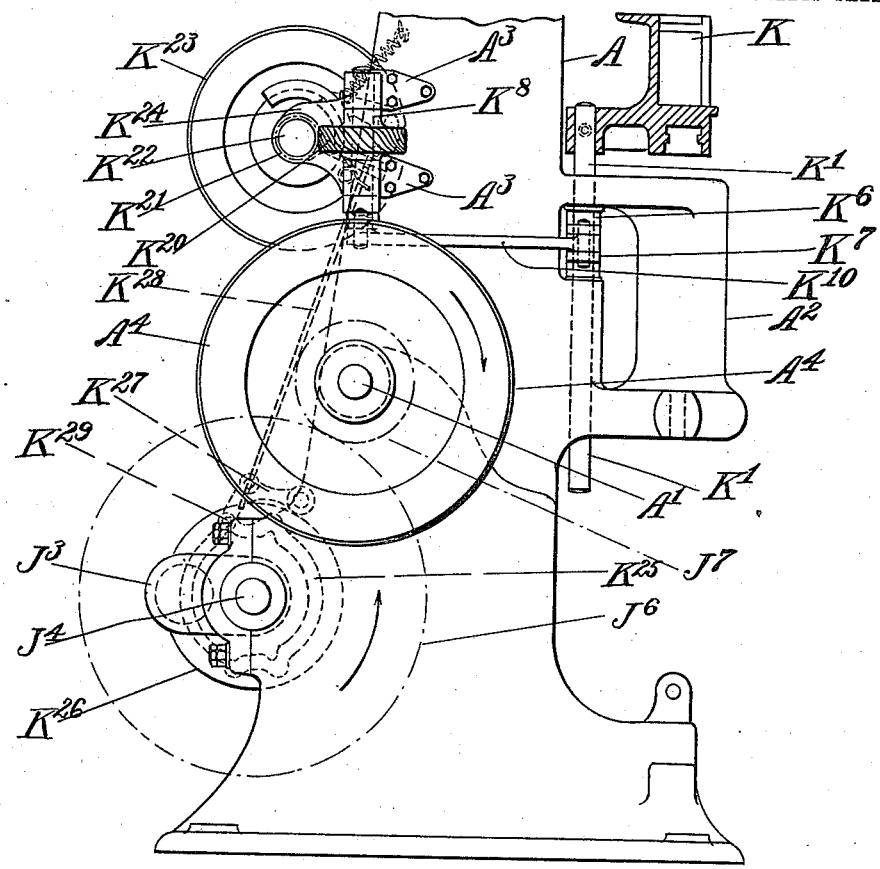
Figure 9:
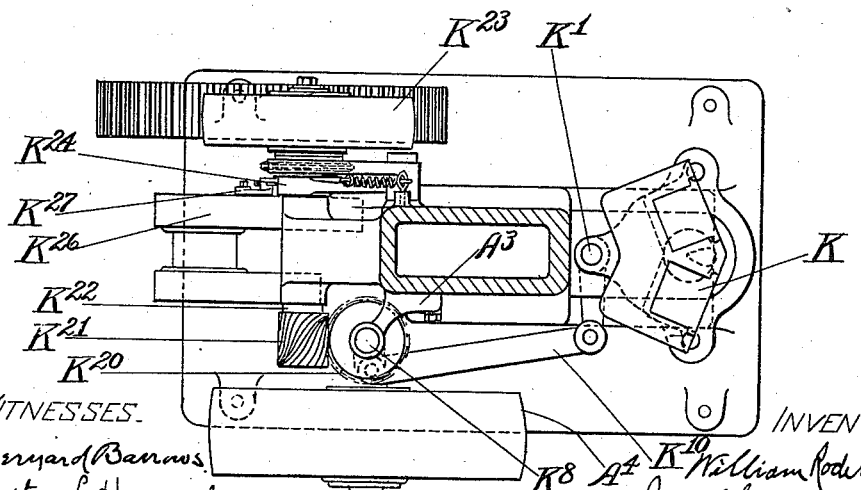
Figure 10:
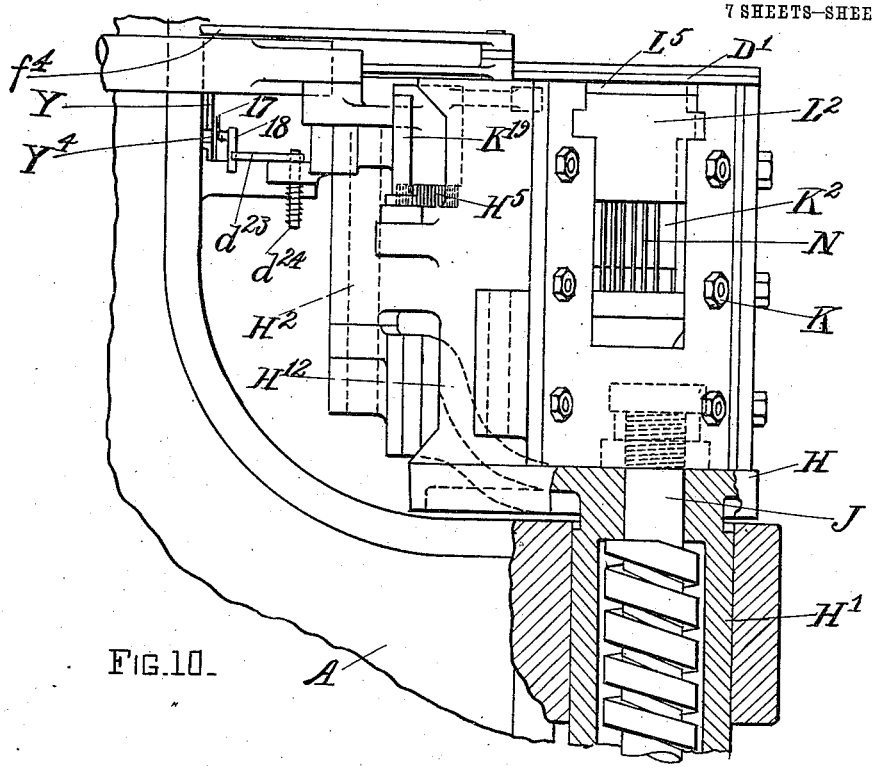
Figure 11:
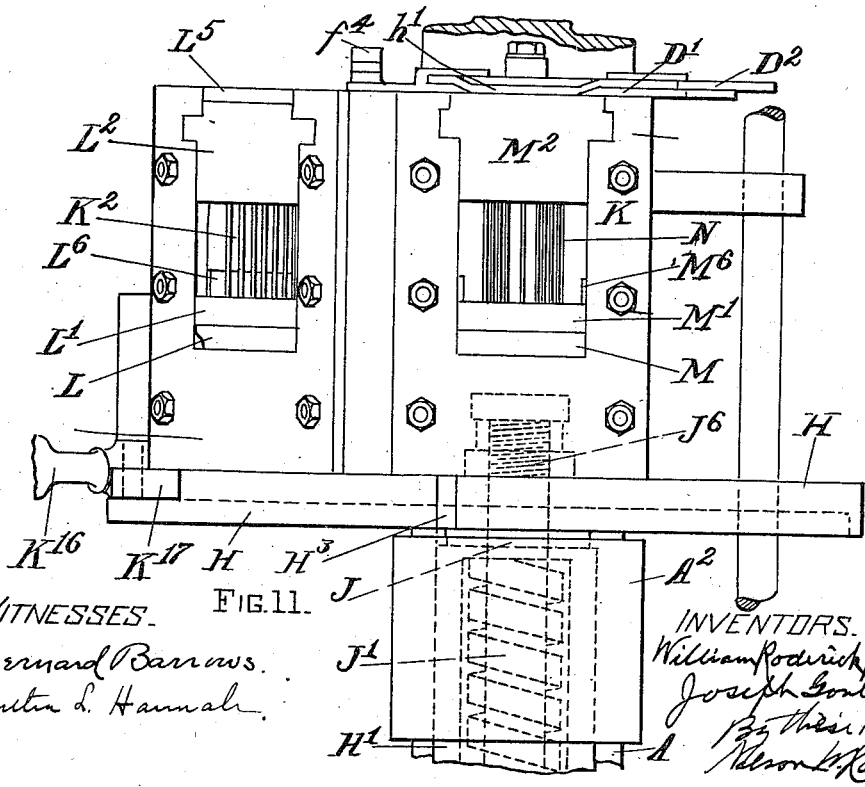
Figure 12:
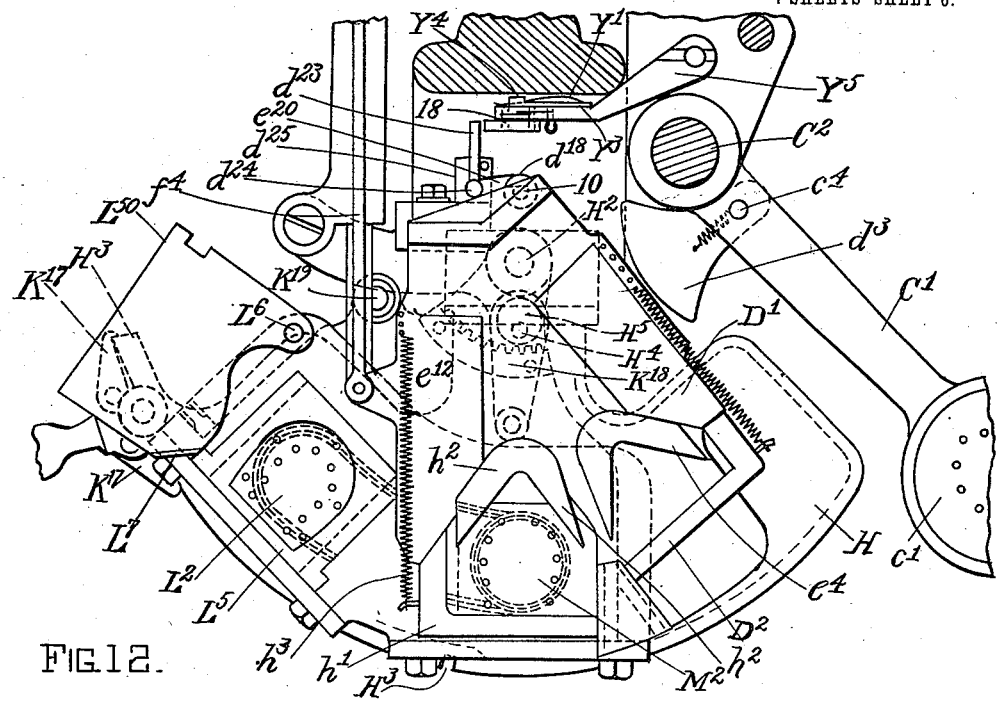
Figure 13:
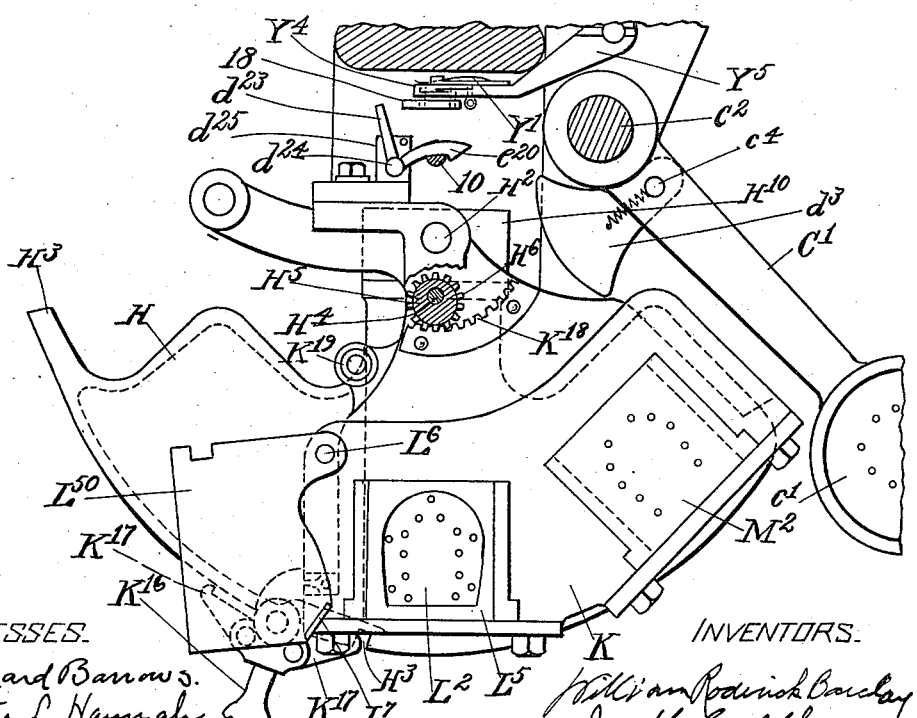

In the accompanying drawings:—Figures 1 to 7 illustrate a convenient construction of a machine embodying the invention, and Figs. 8 and 9 show a modification thereof. Figs. 10 to 24 illustrate a preferred manner of carrying out the invention as an attachment to a heeling machine of the class described in said Letters Patent No. 694,656 above referred to. Fig. 1 is a side elevation, partly in section, of a heel-tip or top-lift attaching machine according to the present invention. Fig. 2 is a front elevation, and Fig. 3 is a plan of the same. Fig. 4 is a detail view showing the mechanism for reciprocating the movable frame. Fig. 5 is a front elevation on an enlarged scale of the movable frame with its contained parts. Fig. 6 is a plan view of the same. Fig. 7 is a detail view of the nail carriers. Fig. 8 is an elevation, partly in section, showing a modified arrangement for operating the movable frame. Fig. 9 is a sectional plan of Fig. 8, certain shafts and other parts being omitted for the sake of clearness. Fig. 10 is a side elevation, partly in section, of a portion of a machine such as described in said Letters Patent No. 694,656, modified to include features of our invention. Fig. 11 is a front elevation of parts shown in Fig. 10. Fig. 12 is a plan view of the parts shown in Figs. 10 and 11, the movable frame being in position with the heel nail-block over plunger, as in those figures. Fig. 13 is a similar view to Fig. 12 but with the swinging plate removed and with the movable frame positioned with the tip nail-block over the plunger. Fig. 14 is a perspective view of the tip and filler holder detached. Fig. 15 is a perspective view of the tip nail-holder and the tip-driver-block detached. Fig. 16 is a perspective view of the tip-driver-block actuating-slide detached. Fig. 17 is a plan, and Fig. 18 is a side view of the spring-controlled swing plate detent-trip, and means according to this invention to put the trip in and out of operation, the parts being in position to allow the trip to operate. Figs. 19 and 20 are respectively similar views to Figs. 17 and 18, but show the parts with the trip rendered inoperative. Fig. 21 is an underside view of part of the swinging plate illustrating the means for putting the heel breast-clip out of operation, and Fig. 22 is a section on the line 22—22 of Fig. 21. Fig. 23 is a side elevation, and Fig. 24 is a plan of the means to render the jack-raising toggle inoperative.

Like letters of reference indicate like parts in all the figures.

With reference first to Figs. 1 to 9:—

A is the main frame of the machine, comprising an upward extension or pillar curved over to the front of the machine at the top to form an overhanging portion to sustain the jack, which may be of any suitable known construction; preferably, as shown, the jack $B^2$ is pivoted on to a screw-threaded pin B working in an internally threaded sleeve $B^3$, arranged to rotate but not to have longitudinal movement in a bearing in the overhanging portion of the frame. A hand-wheel $B^4$ is provided to rotate the sleeve. The jack may thus be swung to conveniently place a shoe thereon or remove the same, and may be vertically adjusted to enable the machine to operate on heels of varying thickness. Below the jack and in line therewith is a horizontal table or head H, having a downward extension $H'$ capable of vertical movement, but not of horizontal movement, in a bearing formed in a projection $A^2$ from the main frame A. The extension $H'$ is hollow to receive a nail-driver plunger J which extends above the table H through a hole in the same; the top of the plunger is preferably provided with a grooved head $J^6$, screwed or otherwise secured thereon, and adapted to engage as a working fit in a slot in either a heel-tip drivers-actuating slide L or a heel drivers-actuating slide M, as hereinafter described. The hollow portion of the extension $H'$ is greater in cross-section than the hole in the table H through which the plunger passes, a shoulder being thus formed which engages one end of a spiral spring $J'$ which surrounds the upper part of the plunger within the hollow of the extension. The other end of the spring engages a shoulder on the plunger formed by an increase in diameter in the lower portion of the plunger as shown in Fig. 1. Preferably the plunger is actuated so as to make two strokes to one revolution of its driving shaft and this may be conveniently done by means of a toggle $J^2$ actuated by a crank $J^3$, (see particularly Figs. 3 and 4), on a shaft $J^4$ carried in bearings in the back of the frame A, the center joint of said toggle being connected to the crank by a connecting rod $J^5$ and the throw of the crank being proportioned to operate the toggle beyond its dead center on each side, so that one revolution of the shaft $J^4$ imparts two vertical reciprocations to the plunger. On one end of the shaft $J^4$ is a gear-wheel $J^6$ which is driven by a second gear-wheel $J^7$ on one end of the main driving shaft $A'$, carried in bearings in the machine frame above the shaft $J^4$. The shaft $A'$ is actuated by a pulley $A^4$ driven by a belt from any convenient source of power.

Resting on the table H is a movable frame K, shown detached in Figs. 5 and 6. The frame is shaped in plan substantially like a sector, fixed at its center on to the top of a short vertical rock-shaft K', which passes down through the table H and is held in bearings in the projection $A^2$ of the machine frame, so as to be both rotatable and movable endwise therein. The front of the frame contains two vertical rectangular recesses $K^2$ $K^3$ each extending throughout the whole height of said frame, placed side by side and similarly located with relation to the shaft K' so that partial rotation of the shaft K' in either direction will cause one recess to occupy the position previously occupied by the other. The lower portion of each recess $K^2$ $K^3$ is provided with vertical guide ways $K^4$ in which work nail-drivers actuating-slides, L M respectively, and nail-drivers-blocks, L' M' respectively. Each nail-drivers-block rests on the top of its actuating-slide so as to be raised with the latter, and is constrained to follow its downward movement by off-sets $L^6$ $M^6$ formed on upward side extensions of the slide, which offsets prevent movement of the block away from its slide in an upward direction while allowing the block to be readily removed from the frame. The drivers N have their lower ends secured in any convenient manner in the upper surface of the blocks L' M', while their upper ends just enter the lower end of nail cavities $L^4$ $M^4$ formed in two nail holders $L^2$ $M^2$, carried respectively in the upper portion of the recesses $K^2$ $K^3$, and held from vertical movement in the frame K by horizontal bearings, $L^3$ $M^3$ respectively, engaged in grooves in the recess wals. In the bottom of each driver-actuating slide L, M is a curved slot O, the curves forming the sides of the slots being arcs of which the pivotal shaft K' of the movable frame is the center. Each slot opens through the side of its slide adjacent to the central line of the frame into a hole in the triangular portion of the frame lying between the recesses $K^2$ $K^3$, thus forming a continuous path from the middle of one slide to the middle of the other. The slots are shaped in cross-section to form a working fit with the head $J^6$ of the plunger J before described, which is received in them so that the plunger J may be brought, as desired, within either of the driver-actuating slides L or M by rocking the shaft K', which, as before described, forms the pivot of the movable frame K. A nail-holder and a nail-drivers-block are shown detached in Fig. 15 and an actuating slide in Fig. 16 of the drawings. Cover plates $K^5$ may be bolted over the faces of the frame in which the recesses are sitauted, but these are preferably cut away in front of the nail-driver-blocks, drivers, and nail-holders, allowing these parts to be readily changed to suit varying sizes of heels.

The following is a convenient means for rocking the shaft K'. The boss $K^6$ of an arm $K^7$ (see Figs. 1 and 4) is spindled on to the shaft K' so that the two will rotate together, but the boss is held from endwise or vertical movement in a slot in the projection $A^2$ of the machine frame, as shown in Fig. 1, while the shaft K', as before said, is free for such movement. A second vertical rocking shaft $K^8$, carried in brackets $A^3$ on the machine frame, has fixed on its upper end a short arm $K^9$, the free end of which is connected by a link $K^{10}$ with the free end of the arm $K^7$. The lower end of the second rock-shaft $K^8$ carries a pinion $K^{11}$ which meshes with teeth on a horizontal bar $K^{12}$ adapted to slide in guide ways on the machine frame. On one end of the bar $K^{12}$ is fixed a roller $K^{13}$ engaged with a cam groove $K^{14}$ on the face of a disk $K^{15}$ fixed on the shaft $J^4$. Conveniently for compactness of construction this disk may form, as shown in the drawings, one arm of the crank $J^3$ above described as operating the plunger.

An alternative construction for rocking the shaft K' is shown in Figs. 8 and 9. In this construction the vertical shaft $K^8$ is shown extending upward instead of downward as above described, and, in place of the pinion $K^{11}$, is provided with a worm-wheel $K^{20}$ which meshes with and is driven by a worm $K^{21}$ carried on a shaft $K^{22}$ rotatably carried in bearings on the machine frame, the wheel $K^{20}$ and worm $K^{21}$ being so proportioned that four complete revolutions of the worm $K^{21}$ impart one complete revolution to the shaft $K^8$. On one end of the shaft $K^{22}$ is a loose pulley $K^{23}$ continually rotated at high speed by a convenient source of power, the pulley being connected to the shaft $K^{22}$ to operate the same at intervals by a clutch $K^{24}$. The clutch may be of a well-known type which permits one revolution to be imparted to the shaft and then automatically stops and need not be particularly described for the purposes of this specification. The clutch is put into action by a cam groove $K^{25}$ on a disk $K^{26}$ carried on the shaft $J^4$ and which, as in the first-described construction, may constitute one arm of the plunger-operating crank $J^3$. The clutch is operatively connected with the cam groove $K^{25}$ by means of a roll $K^{29}$, lever $K^{27}$, and connecting rod $K^{28}$, the cam groove being shaped to put the clutch into operation and rotate the shaft $K^{22}$ so as to give similarly timed movements and periods of rest to the movable frame K as in the previous construction.

The heel and the tip and filler or the top-lift may be retained over their respective nail or slug holders by means of spring-clips of any known construction, the heel-tip and filler or the top-lift being preferably located, as in the construction now being described, and illustrated more particularly in Fig. 5, just below the level of the under surface of the heel so as to enable the tip or top-lift to be placed in operative position beneath the attached heel without need for any raising of the latter after it has been attached to the boot, to accommodate the thickness thereof. To enable this to be done, as shown in Figs. 2 and 5, the nail-holder $L^2$ is located in its recess $K^2$, at a slightly lower level than is the nail-holder $M^2$ in the recess $K^3$. A preferred form of spring-clip, the same in construction for both heel and tip, is shown in Figs. 5 and 6. It is similar to that described in the aforesaid Letters Patent No. 694,656 and comprises in each case an adjustable back-gage P, and a spring-controlled breast-gage P', the shanks of the said gages working in guides formed by plates $P^2 P^3$ respectively, screwed on to the top of the movable frame K.

The nail-holders $L^2 M^2$ may be provided with nails or slugs in any convenient manner by hand or mechanically. Preferably, as shown in the figures, two nail-carriers S S' are provided carried in frames each on the end of a swinging arm $S^2 S^3$ respectively. Each arm is pivoted on a small bracket $S^4$ bolted on the machine frame. These arms with their supporting brackets are shown clearly in Fig. 7. The ends of the arms farthest from the carrier frames are curved toward each other and provided with geared segments $S^5$ which intermesh, so that movement in one arm produces a corresponding movement in the other. One of the arms, say $S^2$, has a handle $S^6$ by which the operator may swing the arms from the nail-receiving position shown in broken lines in Fig. 3 to the nail-delivering position shown in full lines in the same figure, and in Fig. 7. The arm $S^2$ is also provided with a spring catch $S^7$ (shown in Fig. 7) arranged to engage a detent (not shown) on its supporting bracket $S^4$ to retain the arms in the nail-receiving position.

Preferably to supply the nail-carrier-blocks with nails or slugs two sets of nail-delivering apparatus are provided, one on each side of the machine. These may be of any suitable construction and supported in any convenient manner and may be conveniently operated by a horizontal shaft $S^8$ fixed in a lug on the back of the machine frame, but these form no part of the invention and need not, therefore, be described in this specification.

As usual in this class of apparatus, the machine when started is arranged to run only while one complete cycle of operations of the machine is performed and then to stop automatically, that is, in the machine as herein described, after one complete revolution of the shaft $J^4$. A suitable start and stop gear, which however forms no part of this invention, is provided, the gear being started by the operator depressing the treadle T. Preferably this stoppage is arranged to take place so that both of the sets of nail drivers are in inoperative position, that is, neither set is in position between the plunger and the jack. It is also usual in this class of machine to provide mechanism which will prevent the machine being started except when the nail carriers are in the nail-receiving position. The following convenient mechanism for this purpose is illustrated in the drawings. Pivoted on the nail-carrier arm $S^2$ is a horizontal stud T', Fig. 3, free to slide in a sleeve $T^2$ fixed on the top of a vertical shaft $T^3$ carried in brackets on the machine frame. On the lower end of the shaft $T^3$ is fixed a segmental gear $T^4$ which engages a rack on a horizontal sliding rod $T^5$. The rod $T^5$ is carried in bearings in the machine frame and so arranged in relation with the segmental gear $T^4$ that when the carrier arm is moved from the nail-receiving position the rod engages with an arm $T^6$, forming part of or in fixed relative position to the treadle T, so as to prevent the depression of the latter.

The operation of the machine is as follows:—The stopping gear is arranged to stop the machine with the movable block K in a central position, as shown in Figs. 2 and 3, that is, with the plunger midway between the two nail-driver actuating-slides and engaging neither of them, both sets of nail drivers being thus away from their operative position under the jack. The operator having placed a shoe on the jack swings the nail carriers by means of the handle $S^6$ into their nail-delivering position, shown in full lines in Fig. 3, and then returns them, a set of nails or slugs having been delivered to each nail-holder, to their nail-receiving position, shown in broken lines in Figs. 2 and 3. He then places a heel in the heel spring-clip over the nail-holder $M^2$ and a tip with its filler or a top-lift in the spring-clip over the nail-holder $L^2$, and depressing the treadle T starts the machine. The plunger J commences to rise, lifting the table H and with it the movable block K, and the heel. At the same time, owing to the shape of the cam groove $K^{14}$ the movable block K is swung toward the left hand of the observer, looking at Fig. 2, so that before the heel has been brought in actual contact with the shoe, the heel and its set of drivers-actuating-slide, drivers-block and nail-holder are brought into operative position beneath the shoe and above the plunger. There is now a dwell in the cam and the frame K consequently remains stationary as to horizontal movement, while the plunger still rising first presses the heel firmly against the shoe, and then raising the drivers, inserts the nails. The plunger commences to descend, and as soon as the heel, now fixed on the shoe, is clear of its spring-clip, the movable frame moves toward the right hand of the observer of Fig. 2, so that at the completion of one half of a revolution of the shaft J the frame is again in a central position and the plunger in its lowest position. The movements are now repeated, but with the side movement of the movable frame reversed, the frame moving first toward the right hand, bringing the tip and its set of nail-holder, drivers-block, and actuating slide beneath the shoe and over the plunger, the frame finally moving again toward the left hand, so that the frame is in its original central position on the completion of the revolution of the shaft J.

With reference now more particularly to Figs. 10 to 24, which illustrate a convenient construction for combining the invention with a heel-attaching and top-lift-spanking machine of the kind described in the said Letters Patent No. 694,656:—in the machine of the class described in said Letters Patent only one nail-holder and one set of nail drivers are employed and a swing frame or plate, such as D', is provided which carries, in jaws $h'$ $h^2$ and $D^2$ $e^4$ respectively, a heel and a top-lift, the said plate being adapted to be swung so as to place the heel and the top-lift alternately in position over the nail-holder and set of drivers operated by a reciprocating plunger. The heel is first attached, leaving the heads of the nails projecting beyond the same; the swing plate then oscillates and brings the top-lift under the attached heel on to which it is then spanked. To enable this to be done by the same nail-holding-block as that which is used in the driving of the heel-attaching nails and by elevation of that block to the same height and by the same means as in the heel-attaching operation, a toggle-lever arrangement C $C^2$ is provided at the back of the machine to raise the boot after the heel is attached sufficiently to allow the top-lift to come underneath the same. In carrying out the application of certain features of this invention to this class of machine the following changes and additions are made:—

The nail-driving plunger is employed in conjunction with a table and a movable frame substantially as in the first construction herein described, the movable frame being pivoted on an upward extension of the table and preferably manually operated by means of a handle, its operative position being governed by two detents attached to said handle. It is placed in the machine so that its top surface is slightly below the level of the swinging plate D' aforesaid. The tip and filler are preferably carried in a recess in a plate arranged over their nail-holder, and the heel, carried in the heel-holder of the swinging plate, is thus at a slightly higher level, so that the tip and filler may be moved laterally into operative position beneath the attached heel without any raising of the latter, rendering the jack-raising movement referred to above unnecessary. Mechanism is, therefore, provided for rendering the jack-raising mechanism referred to above inoperative when desired. The heel to be attached is carried in the spring heel-clip provided in this class of machine on the swinging plate D', and, as this plate remains stationary while the improved machine is used to attach tips and fillers, mechanism is provided for throwing out of action, when desired, the means for swinging the said plate, leaving it in position with the heel-holder over the nail-plunger, during the whole cycle of operation of the machine. It is, therefore, necessary to insure that the holder leaves a free passage for the tip when raised by the plunger, and to prevent the spring-clip, forming part of the holder, from closing in under the heel when the heel-carrying plate, raised with the movable frame aforesaid, drops after the heel has been attached, as in that case the clip would get in the way of the tip when the latter is being moved up for attachment to the heel. Mechanism is, therefore, provided for moving and holding the jaws of the holder a proper distance apart after the removal of the heel, and clear of the rising tip.

The Figs. 10 to 24 illustrate so much of a machine such as is shown in the second construction described in the aforesaid Letters Patent as is necessary for a full understanding of the additional mechanisms embodying this application of the invention. The plunger J and the table H are preferably substantially the same as described in the first construction of the machine herein set forth, as is also the arrangement in the movable frame K of the two sets of drivers-actuating slide and block, and nail-holder, and the engagement with the movable frame of the head of the plunger. While resting on and being capable of reciprocation across the table H, instead of being secured to a rocking shaft such as K', as in the said first construction, the movable frame is pivotally carried on a vertical stud $H^2$ forming part of an upward extension $H^{12}$ of the table H. The movable frame has a handle $K^{16}$, not shown in Fig. 10, by which it may be moved across the table to bring either the heel or the tip nail-holder in operative position over the plunger. The handle is provided with detents $K^{17}$ which engage catches $H^3$ on the table H to lock the movable frame in its two correct operative positions, that is, with either the heel nail-holder or the tip nail-holder over the plunger, the normal position when the machine is at rest being with the heel nail-holder in that position, as shown in Fig. 12. The movable frame is not provided, as in the first construction, with the spring-clips P P' for the heel and tip. As stated above, the heel is carried in clips on the swinging plate D' while the tip and filler are carried in a suitably shaped hole in a block $L^5$, shown detached in Fig. 14, which rests on the tip nail-holder $L^2$ carried in the recess $K^2$ of the movable frame K, the upper surface of the block $L^5$ being on a level with the upper surface of the said movable frame. The movable frame K is positioned in the machine beneath the swinging plate D' so that its upper surface is clear of the under surface of the plate, allowing the said frame to be swung beneath the plate. The swinging plate D', upon which is supported the heel-holder $h'$ $h^2$ and top-lift carrier $D^2$ $e^4$, is substantially similar to that disclosed in the second construction of machine described in the before-mentioned Letters Patent No. 694,656. Instead however of being mounted on a stud in the nail-block head the plate is mounted, for a purpose hereinafter fully explained, on a pin $H^4$ eccentrically carried in a bush $H^5$ mounted in a bearing carried on the head of the vertical stud $H^2$ which, as before described, forms part of the upward extension $H^{12}$ of the table H. In the said Letters Patent the movements of the swinging plate D' are operated and controlled in the following manner:—The nail carrier $c'$, which delivers the nails to the heel nail-holder, is carried on an arm C' free to turn on a stud $C^2$ on the machine frame and having a handle (not shown) and a spring catch (not shown) which retains the carrier in its normal nail-receiving position until removed therefrom by the operator. On the lower end of a stud $c^4$ on the carrier arm is a jointed actuator or cam $d^3$, formed of two parts united by a pin and spring, so as to permit the free end of the actuator to be turned down when required. The free end of the actuator is curved, and in the movement of the nail carrier arm C' from the nail-receiving position into the nail-delivering position said end meets a roller $d^{18}$, said roller being mounted on a stud 10 extending downwardly from the swinging plate D' and swings the plate into position with the heel-holder over the nail-driving plunger. The stud 10 is cut away on one side below the roller $d^{18}$, and whenever the plate D' is in position so that a heel carried thereby is over the plunger ready to be attached, the stud is caught by one arm of a spring-controlled locking device or detent $e^{20}$ having a tail $d^{23}$ and pivoted at $d^{24}$ on an adjustable block $d^{25}$. To release the stud 10 a trip or releasing device 18 is pivoted on one side of an arm $Y^5$ secured on to a portion of the main frame and is held by a spring 17 above the tail $d^{23}$ of the detent, so that as the detent rises with the plate D', its tail $d^{23}$ engages a notch on the trip 18 and raising the latter, passes above it. On the following descent of the plate D' the tail $d^{23}$ engages an inclined surface on the trip 18, and the detent is turned, releasing the stud 10, allowing the said plate to be swung by a spring-controlled rod $f^4$ into position with the top-lift over the nail-driving plunger.

For the purposes of the present invention the following mechanism may be provided to place and to hold the trip 18 when desired out of action:—A flat spring Y' is fixed at one end on to the opposite side of the arm $Y^5$ to that on which the trip 18 is pivoted. The free end of the spring is provided with a pin $Y^2$ engaged in a hole bored through the arm $Y^5$ and so positioned that when the trip 18 is in its lower position as shown in Fig. 18, the pin is pressed by the spring Y' against the side of the trip. When the trip is raised by the detent, as above described, it passes above the pin $Y^2$, which, under the pressure of its spring Y', unless prevented by a device as hereinafter described, is protruded in the path of the trip, preventing its falling under the action of the spring 17 and retaining it in the position shown in Fig. 20 out of engagement with the tail $d^{23}$ of the detent, during any subsequent upward or downward movement of the same. The detent is consequently not turned on its downward movement and retains the plate D' in fixed position. To enable the operator to throw the pin $Y^2$ out of operation, when it is desired to spank on a top-lift and allow the plate D' to be swung for this purpose, a handle Y may be pivoted on the trip-carrying arm $Y^5$. The handle Y is provided with an arm $Y^3$ having a wedge-shaped end $Y^4$ adapted to engage, when the handle is in a vertical position, between the spring Y' and the arm $Y^5$ on which it is carried, so as to draw back the pin $Y^2$ from the path of motion of the trip 18 into the position shown in Fig. 17 so that the plate D' may be swung at the normal period in the cycle of operation of the machine.

As before stated, the heel is held in the holder or spring-clip on the swinging plate D'. This holder comprises a guideway plate $e^{12}$, arranged to receive the shanks respectively of the breast-gage $h'$ and the back-gage $h^2$. The breast-gage is provided with a suitable spring $h^3$ which acts normally to keep the breast-gage in contact with the breast of the heel. The back-gage $h^2$ is normally stationary on the plate, but has to be capable of adjustment as described and illustrated in the aforesaid Letters Patent to adapt it to heels of different sizes, this adjusting device being omitted from the drawings accompanying this specification for the sake of clearness. It is necessary to prevent the breast-gage $h'$ from closing in under the heel when the swinging plate $D'$, raised with the movable frame K and table H, drops after the heel has been attached, as in that case it would get in the way between the tip and the attached heel when the tip is being moved up for attachment to the same; it is also advisable to move the back-gage to insure the allowance of clearance for the tip. To move the back-gage $h^2$ and to secure the automatic opening of the breast-gage $h'$ the following mechanisms may be provided:—As above stated, the plate $D'$ for the purpose of this invention is mounted on pin $H^4$ eccentrically carried in a bush $H^5$ on which pin the plate swings in the normal operation of the machine, in the manner described in said Letters Patent No. 694,656 before referred to. The bush $H^5$ has attached to its lower end a gear pinion $H^6$, which is engaged by a segment gear $K^{18}$ formed on or attached to the movable frame K, the gear being so positioned relatively to the pinion that as the frame K is moved, after a heel has been attached, to place the tip and filler in position over the plunger the gear actuates the pinion and its attached bush to move the pin $H^4$ and with it the swing plate $D'$ and the back-gage $h^2$ backward. Simultaneously with this a roller stop $K^{19}$ on the movable frame (see Figs. 12 and 13) engages with a striking piece $H^7$ on a small slide $H^8$ (see Figs. 21 and 22) on the under side of the said swing plate. The slide $H^8$ carries an upwardly extending detent or pawl $H^9$ which engages with ratchet teeth $H^{10}$ formed on the under surface of the shank of the spring-controlled breast-gage $h'$, so that as the movable frame K is actuated the breast-gage or clip $h'$ is thereby swung forward toward the operator and clear of the heel. A spring $H^{11}$ draws back the slide to its normal position when the striking piece is released by the return movement of the movable-frame. The hole in the plate $D'$ through which the pawl $H^9$ extends to engage the teeth $H^{10}$ is so shaped that when the slide is in its normal position, that is, out of engagement with the roller $K^{19}$, the pawl abuts against the edge of the said hole and is held out of engagement with the teeth, thus leaving the breast-gage $h'$ under the normal control of its spring $h^3$.

In said Letters Patent No. 694,656 the jack is raised to enable the top-lift to be placed under an attached heel in a known manner by means of a walking beam and its attached toggle C $C^2$, actuated by means of a pendulum lever and operative connections (not shown) with the nail-driving plunger in a well known manner, so as to depress the jack for the attachment of the body of the heel, and then to raise the same sufficiently to permit the after attachment of the top-lift. As before stated, when the movable block is employed to attach a tip and filler, this movement of the jack is not required and the following is a convenient device for holding the jack stationary when desired:— As shown in Figs. 23 and 24, a wedge W is provided on the end of a curved arm $W'$ pivoted in a boss $W^2$ on the machine frame and provided with a handle $W^3$, the wedge and arm being so positioned that by turning the arm on its pivot the wedge may be placed, as shown in full lines in Fig. 24, between the toggle C $C^2$ and the machine frame, thus preventing the breaking of the toggle and consequent raising of the jack. As shown in Fig. 23, the wedge may be conveniently carried in horizontal guides $W^4$.

As shown in Figs. 12 and 13 the frame K may be provided with a cover plate $L^{50}$ pivoted at $L^6$ on a stud on the frame K, so to be swung over the heel-tip and filler, when the same has been placed in position in the frame, to prevent vibration engendered by the movements of the said frame jerking the nails up out of the nail-carrying block. When the frame K is swung over to place the tip in operative position over the plunger an abutment $L^7$ on the cover plate is engaged by the swinging plate $D'$ so that the cover plate does not move with the frame K under the heel, but is held back on its pivot as the tip moves into operative position.

When it is desired to use the machine to nail on a heel and then spank on a top-lift in the manner described in said Letters Patent No. 694,656, the operator locks the movable frame K in the position shown in Figs. 11 and 12, withdraws the wedge W from the position shown in full lines in Figs. 23 and 24 into the position shown in broken lines in Fig. 24, allowing the jack to be raised and lowered by the action of the toggle C $C^2$, and by means of the handle Y places the wedge-shaped end $Y^4$ of the arm $Y^3$ in the position shown in Figs. 17 and 18, permitting the trip 18 to act and the plate $D'$ to swing after a heel has been attached. The machine is then operated as described in the patent referred to above. When, however, it is desired to nail on a heel and then nail on a tip and filler, or secure a top-lift with slugs, the operator reverses the position of the wedge W and handle Y, thereby locking the jack-raising toggle and the plate $D'$, and after the heel has been attached places the tip and filler or the top-lift in position over the plunger by swinging the movable frame K into the position shown in Fig. 13.

Having described our invention, what we claim as new and desire to secure by Letters Patent of the United States is:—

1. A heel attaching machine, having in combination, a plurality of nail holders, a plurality of parallel sets of vertical nail drivers arranged in operative alinement with the holders for successively securing to a shoe a plurality of separate parts to form a heel, a shoe supporting member, means for automatically effecting successive relative movements of the holders and the shoe supporting member to press said parts successively upon the shoe and mechanism operatively connected with a power driven member in the machine for changing the relationship between one set and the shoe supporting member into a like relationship between that member and another set, said sets being maintained in parallel relation during the operation of said mechanism.

2. In a heel attaching machine, the combination with a plurality of sets of nail drivers, a plurality of nail holders arranged in operative alinement with their respective sets of drivers, and a shoe-supporting member, the said sets and nail holders being normally out of operative position relatively to said member, of mechanism operatively connected with a power-driven member in the machine for the purpose of moving one of said sets and its nail holder into operative position in relation to the shoe-supporting member and of thereafter moving another set and its nail holder in a different direction to produce a like relationship between said parts and the shoe-supporting member.

3. In a heel-attaching or like machine, the combination with a plurality of sets of nail drivers, a plurality of nail holders arranged in operative alinement with their respective sets of drivers, a shoe-supporting member, the said sets and nail holders being normally out of operative position relatively to the said member, and mechanism operatively connected with a power-driven member in the machine for the purpose of moving one of said sets and its nail holder into operative position in relationship to the shoe-supporting member and of thereafter producing a like relationship between that member and another set and its nail holder, of a plurality of sets of nail-loaders or nail-transferrers arranged to simultaneously supply nails to a plurality of said nail holders when these are not in operative position relatively to the shoe-supporting member.

4. In a heel-attaching or like machine, the combination with a shoe supporting member, of a plurality of sets of nail drivers, a plurality of nail holders arranged in operative alinement with their respective sets of drivers and automatic mechanism for moving said sets and nail holders cross-wise of the shoe supported on said member for the purpose of changing the relationship between one set of nail drivers and the shoe supporting member into a like relationship between that member and another set, and means carried by said holders for retaining in position thereon parts to be successively attached to the shoe.

5. A heel attaching machine, having in combination, a shoe supporting member, a plurality of nail holders having drivers arranged therein, automatic means for successively bringing said holders into operative alinement with the shoe supporting member, means for successively effecting relative approaching movements of the shoe supporting member and the nail holders to press parts of a heel carried by the holders into engagement with the shoe arranged to be actuated after a nail holder has been moved into operative relation with said supporting member and automatic means for actuating said drivers to attach said parts to the shoe while they are held in engagement with the shoe.

6. In a heel-attaching or like machine, the combination with a shoe-supporting member and a reciprocating plunger arranged for movement toward and from the shoe-supporting member, of a movable frame having a plurality of sets of drivers, the drivers of all the sets being arranged and maintained at all times parallel to each other, a plurality of nail holders arranged in operative alinement with their respective sets of drivers, means for automatically effecting successive relative movements of the holders and the shoe-supporting member to press upon a shoe parts to be successively attached, and mechanism operatively connected with a power-driven member in the machine and acting to control the change of relationship between one said set and its nail holder and the shoe-supporting member into a like relationship between that member and another set and its nail holder.

7. A heel attaching machine, having in combination, a shoe supporting member, a plunger arranged for reciprocatory movement, a plurality of vertical nail holders arranged to have engagement respectively with the parts to be attached, a plurality of sets of nail drivers arranged respectively in operative alinement with the nail holders, and means for oscillating said sets of drivers and their respective nail holders to bring said holders successively into operative position between the shoe supporting member and the plunger and for engaging each set of drivers positively with said plunger.

8. In a heel attaching or like machine, the combination with a plunger, a plurality of nail holders arranged for engagement respectively with parts to be successively attached to a shoe, a plurality of sets of nail drivers, said nail holders and drivers being arranged for movement into and out of operative relation to said plunger, and mechanism for imparting to the plunger two reciprocations for each rotation made by a driving shaft, of means for automatically correlating the movements of the nail holders and the sets of drivers into and out of operative relation to the plunger with the reciprocatory movements of said plunger.

9. In a heel-attaching or like machine, the combination with a reciprocating plunger and a table, spring-supported on the plunger for the purpose described, of a movable frame supported by the table and containing a plurality of sets of nail drivers and means to reciprocate the frame across the table to bring each set of nail drivers as desired into operative connection with the plunger.

10. In a heel-attaching or like machine, the combination with a reciprocating plunger, a movable frame sustained by the plunger having a plurality of sets of nail drivers and a shaft for oscillating the frame capable of both endwise and rotative movements, of a cam and splined connections between the cam and the shaft to rock the latter and swing the movable frame.

11. In a heel attaching or like machine, the combination with a plunger and a movable frame containing a plurality of nail driver actuating slides constructed to be successively connected to the plunger, a plurality of sets of drivers mounted upon the slides and a plurality of nail holders arranged in alinement with the sets of drivers and adapted to have engagement with successive parts to be nailed, means for successively actuating said drivers in timed relation with the movements of said slides, and means for supplying nails to said holders.

12. A heel attaching machine, having in combination a shoe-supporting member, a head arranged for reciprocatory movement toward and from said member, a plurality of sets of drivers and a plurality of nail holders mounted upon said head and arranged to be brought successively into operative alinement with said member, said holders being adapted to have engagement with successive parts to be nailed.

13. A heel attaching machine having in combination, a shoe-supporting member, a head arranged for reciprocatory movement toward and from said member, a plurality of sets of drivers and a plurality of nail holders mounted upon said head and arranged to be brought successively into operative alinement with said member and means for automatically moving the holders and drivers into and out of operative position.

14. A heel attaching machine having in combination, nail-driving mechanism including a plurality of nail holders for receiving independent sets of nails, and a plurality of inter-connected nail transferrers for supplying nails to said holders, arranged to be moved manually into and out of nail-delivering position.

15. A heel attaching machine having in combination, a shoe support, mechanism for atttaching to a shoe by independent groups of nails successive parts adapted to form a heel, and automatic means for bringing said parts successively into attaching position and for bringing said groups of nails into position to be driven.

16. A heel attaching machine, having in combination, a shoe supporting member, a plurality of nail holders having drivers arranged for movement therein, automatic means for successively bringing said holders into operative alinement with said supporting member, means for automatically effecting successive relative movements of the holders and the shoe supporting member to press upon a shoe parts to be successively attached, and devices for retaining said parts in operative relation to the respective nail holders, said devices being arranged for movement with the holders.

17. A heel attaching machine, having in combination, a shoe supporting member, a pair of nail holders arranged for engagement respectively with parts to be successively attached to a shoe and having their work-engaging surfaces at different levels, means for bringing said nail holders successively into operative alinement with the shoe supporting member and devices for positioning upon said holders the parts to be attached.

18. A heel attaching machine, having in combination, a shoe supporting member, a plurality of vertical nail holders having drivers arranged for movement therein, devices for sustaining parts of a heel in contact with said holders, automatic means for successively bringing said holders into operative alinement with said supporting member, and means correlated with said first-named means for successively actuating the drivers to attach the parts of the heel to the shoe having provision for pressing yieldingly said parts upon the shoe before they are attached.

19. A heel attaching machine, having in combination, a shoe supporting member, a plurality of sets of nail holders having drivers arranged for movement therein, devices for sustaining parts of a heel in operative relation with said holders, automatic means for successively effecting relative movements of said holders and the shoe supporting member to press the parts of the heel upon the shoe constructed to allow said holders to be successively brought into alinement with the shoe supporting member, and means for actuating said drivers to successively attach said parts to the shoe while they are held in engagement with the shoe.

20. A nailing machine, having in combination, a plunger and a plurality of sets of nail drivers each constructed for positive connection with the plunger and arranged to be operated thereby, said sets of drivers being mounted for transverse movements in opposite directions whereby they may be successively connected with said plunger.

21. A nailing machine, having in combination, a driver operating member and a plurality of sets of nail drivers constructed to be positively connected with said member and arranged to be operated thereby, said sets of drivers being mounted for transverse movements in opposite directions relatively to said member whereby when one set of drivers is brought into alinement and connected with said member another set is out of operative relation therewith.

22. A nailing machine, having in combination, driver operating means comprising a plunger, a frame capable of oscillating movements transversely of said plunger, and a plurality of sets of nail drivers carried by said frame and constructed to be sucessssively brought into positive engagement with the plunger as said frame is moved with relation thereto to bring each set of drivers in alinement with said plunger.

23. A nail driving machine having, in combination, driver operating means comprising a plunger, a frame movable in opposite directions transversely of said plunger and having guideways therein and a plurality of sets of nail drivers mounted on slides fitting said guideways and constructed to be successively brought into positive engagement with the plunger as the frame is moved with relation thereto.

24. A nail driving machine, having in combination, driver operating means comprising a plunger, a frame movable in opposite directions transversely of said plunger and having guideways therein, and a plurality of sets of nail drivers mounted on slides fitting said guideways and constructed to be successively connected with the plunger, the drivers of said sets being maintained at all times in parallel relation with each other.

25. A nail driving machine, having in combination, a driver actuating plunger, a frame movable in opposite directions transversely of said plunger and having guideways therein, a plurality of sets of nail drivers mounted on slides fitting said guideways and constructed to be successively connected with the plunger, the drivers of said sets being maintained at all times in parallel relation with each other, a plurality of nail holders arranged in alinement with the sets of drivers, and means for supplying nails to the holders.

26. A nail driving machine, having in combination, a shoe supporting member, a plunger arranged for reciprocatory movement, a plurality of sets of nail drivers, nail holders arranged in respective alinement with said drivers, and means for oscillating said sets of drivers and their respective nail holders to locate said holders successively in operative position between the shoe-supporting member and the plunger and for engaging each set of drivers positively with said plunger.

27. In a nailing machine the combination of a starting mechanism, a nail holder, a nail carrier for delivering nails to said holder, an oscillatory gear segment connected to said carrier to be oscillated as said carrier is moved, and a rack bar in mesh with said gear segment, said rack bar projecting into the path of a part of said starting mechanism to prevent starting of the machine when the nail carrier is in nail delivering position.

28. In a nailing machine the combination of starting mechanism, a nail holder, a plurality of nail carriers movable to and from nail delivering position, said nail carriers being connected together whereby movement of one effects movement of the other, and means connected to one carrier for preventing operation of the starting mechanism when either carrier is in nail delivering position.

In testimony whereof we have signed our names to this specification in the presence of two subscribing witnesses.

WILLIAM RODERICK BARCLAY.
JOSEPH GOULDBOURN.

Witnesses:
ARTHUR ERNEST JERRAM,
GRACE HOLMES.

---

Copies of this patent may be obtained for five cents each, by addressing the "Commissioner of Patents, Washington, D. C."